United States Patent [19]

Elcock et al.

[11] Patent Number: 4,767,249

[45] Date of Patent: Aug. 30, 1988

[54] SELF-BROACHING KEY

[75] Inventors: Robin W. Elcock, Torrance; Belen A. Guevara, Wilmington, both of Calif.

[73] Assignee: Rexnord Inc., Brookfield, Wis.

[21] Appl. No.: 906,705

[22] Filed: Sep. 12, 1986

[51] Int. Cl.[4] .............................................. F16B 39/06
[52] U.S. Cl. ..................................... 411/110; 29/432; 29/525.1; 411/939
[58] Field of Search ............... 411/110, 178, 511, 513, 411/530, 939; 81/10; 29/432, 526 R

[56] References Cited

U.S. PATENT DOCUMENTS

| | | | |
|---|---|---|---|
| 1,158,454 | 11/1915 | DeCamp | 411/939 X |
| 2,958,358 | 11/1960 | Neuschotz | 411/110 |
| 3,039,508 | 6/1962 | Greene | 411/110 |
| 3,103,962 | 9/1963 | Neuschotz | 411/110 |
| 3,328,813 | 7/1967 | Neuschotz | 411/939 X |
| 3,346,031 | 10/1967 | Neuschotz | 411/110 |
| 3,371,697 | 3/1968 | James | 411/110 |
| 3,650,309 | 3/1972 | Neuschotz | 411/110 |
| 3,667,526 | 6/1972 | Neuschotz | 411/110 |

Primary Examiner—Lloyd A. Gall

[57] ABSTRACT

The present invention is a self-broaching key for locking a fastener assembly in a relatively hard carrier material and a method for making such a key. A unique cutting surface (40) is provided with a particular angular orientation relative to the thread form of the carrier passage threads, and includes a curvilinear portion (42) immediately adjacent the tang portion (32). As the key (30) is installed for locking engagement, the cutting surface (40,42) displaces carrier material in a manner which directs the displaced material away from the cutting surface (40) as the key (30) advances into the carrier material. Also provided on the tang portion (32) is a curvilinear surface (46) which further assists in directing the displaced material away from the cutting surface (40). Two pairs of arcuate extensions (47a, 47b and 48a, 48b) are located on the tang portion (32) to temporarily but reliably secure the key (30) in a key slot with a minimum of frictional engagement between the key and the walls of the key slot.

4 Claims, 1 Drawing Sheet

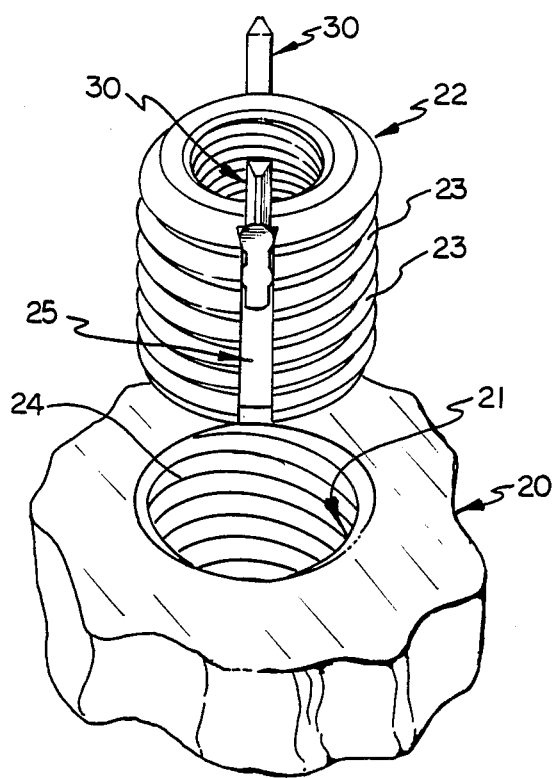
FIG 1
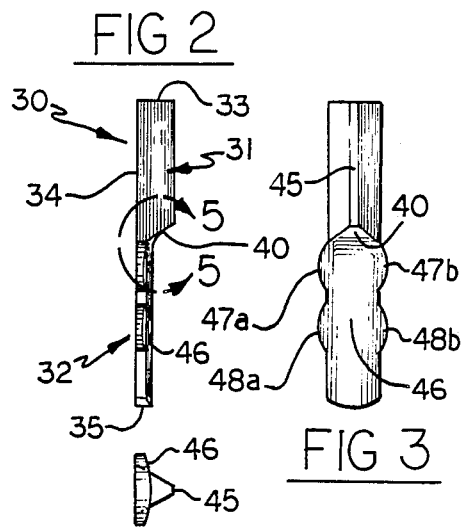
FIG 2
FIG 3
FIG 4
FIG 5
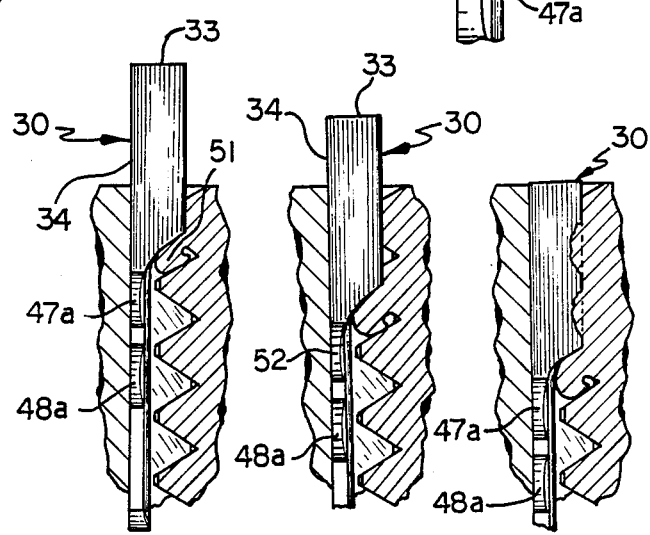
FIG 9  FIG 11  FIG 13
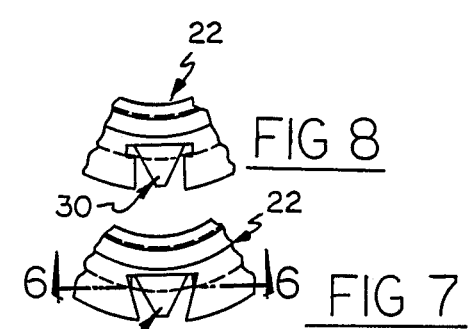
FIG 8
FIG 7
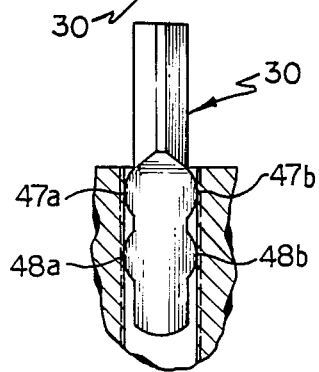
FIG 6
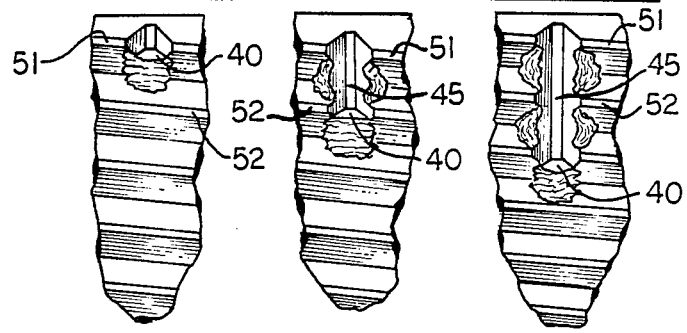
FIG 10  FIG 12  FIG 14

SELF-BROACHING KEY

TECHNICAL FIELD

The present invention relates to fastener assemblies which have locking keys for securing the assembly in a carrier material. In particular the present invention relates to such locking keys which are self-broaching when installed relative to the fastener assembly and the carrier material and a method for making such keys.

BACKGROUND

Threaded fastener assemblies which employ locking keys are well-known in the industry. A good example of such well-known technology is described in U.S. Pat. No. 3,346,031 which issued to Robert Neuschotz on Oct. 10, 1967 for "Threaded Elements and Locking Keys Therefor". For such keys, however, to be installed in materials having a Rockwell hardness of RC26 and above, the threaded passage in the carrier material has had to be broached in order to permit the key to penetrate and position itself in locking relationship with respect to both the fastener assembly and the carrier material. As can be imagined, the need to broach the carrier material for reception of the locking keys requires the customer to perform an additional, and very costly, step beyond merely installing the fastener assembly.

Throughout the past several years, the industry has sought technology which would minimize the amount of extra time, labor, and expense required if such locking keys as shown in the Neuschotz U.S. Pat. No. 3,346,031 are used in very hard materials. As a result of this need, the present invention has been developed to provide the industry a locking key which is self-broaching. The present invention is particularly well-suited to unique applications for which the known locking keys have been entirely unsuitable. The present invention is truly an advance in the state of the art for this technology, and accordingly patent protection is sought.

SUMMARY

The present invention is a self-broaching key which improves upon the known key constructions by providing an engineered angle for penetrating the threaded passage of a carrier material. Specifically, the engineered angle is a cutting surface which causes a unique displacement of the carrier thread material as the key is installed in its locking position between the carrier material and the fastener assembly. The cutting surface extends between the upper or locking portion of the key and the lower or tang portion. To further enhance the invention's advantages, a portion of the cutting surface is curvilinear immediately adjacent the tang portion. The angle of orientation for the cutting surface is selected so as to match the thread form angle of the carrier material threaded passage.

A further feature of the invention is the construction of the tang portion to provide a curvilinear surface opposing the threaded carrier passage, and up to four arcuate portions extending substantially at right angles to the curvilinear surface. The arcuate portions are sized so as to frictionally contain the tang portion in the key slot of the fastener assembly prior to its installation into the carrier material. The unique shape of the arcuate portions provides a ramp or guide for the key to further insure the proper position of the key within the key slot.

The invention also includes the unique method by which the self-broaching key of this invention is manufactured.

These features of the invention and advantages derived therefrom will be explained in greater detail in the detailed description which follows.

BRIEF DESCRIPTION OF THE DRAWINGS

FIG. 1 is a view in perspective which shows one application for the present invention.

FIG. 2 is a side elevational view of a preferred embodiment of the present invention.

FIG. 3 is a front plan view of the preferred embodiment.

FIG. 4 is a bottom plan view of the preferred embodiment.

FIG. 5 is an enlarged view of a portion of which is shown in FIG. 2.

FIG. 6 is a view in partial cross section of the preferred embodiment as seen generally along lines 6—6 in FIG. 7.

FIG. 7 is a top plan view of which is shown in FIG. 6.

FIG. 8 is a top plan view of an alternate key slot containing the preferred embodiment.

FIG. 9 is a view in cross-section of the preferred embodiment and a carrier material during installation.

FIG. 10 is a partial plan view of what is shown in FIG. 9.

FIG. 11 is a view in cross-section of the preferred embodiment and a carrier material as the preferred embodiment progresses during installation.

FIG. 12 is a partial plan view of what is shown in FIG. 11.

FIG. 13 is a view in cross-section of the preferred embodiment after installation thereof in locking relationship with a carrier material.

FIG. 14 is a partial plan view of what is shown in FIG. 13.

DETAILED DESCRIPTION OF A PREFERRED EMBODIMENT

FIG. 1 illustrates a typical application for use of the present invention. A carrier material 20 is shown in which a threaded passage 21 is provided. The carrier material is representative of an aircraft panel or a jet engine component manufactured from heat treated titanium, stainless steels, or inconel, a high-strength nickel alloy steel. An insert 22 representing one component of a more complete fastener assembly is positioned as it would appear immediately before it is installed in the carrier threaded passage 21. The insert 22 includes external or outer threads 23 which are compatible with the threads 24 of the carrier passage 21 so as to permit the insert to be threaded thereinto. Depending upon the size of the insert, two or more key slots 25 are provided which extend across and through the external threads 23. Each key slot 25 receives, initially, the tang portion of a key 30 as shown in FIG. 1.

FIGS. 2-5 provide an understanding of a preferred embodiment for the key of the present invention. In these views the construction of the key may be appreciated. The key 30 has an upper or locking portion 31 and a lower or tang portion 32. The two portions 31, 32 are formed continuous with each other. For reference purposes only the key 30 will be referred to as having a top surface 33, a substantially flat or planar surface 34 and a bottom surface 35. The flat or planar surface 34 is typically constructed so as to permit a sliding displacement of the key 30 along the key slot 25 as the key is being installed therein. The top surface 33 is generally flat in order to provide a driving surface for the installation tool and to provide a flush surface area with the carrier material after the key is finally installed in its locking position. The bottom surface 35 forms the termination of the tang portion 32 and may be curvilinear as shown for the preferred embodiment.

Turning now more specifically to these portions 31, 32, the two portions are connected along the side of the key opposite the flat, planar surface 34 by a cutting surface 40. Such a cutting surface is truly unique in the industry. As can be seen clearly in FIG. 5, the cutting surface 40 is configured so as to have an angle A of orientation which is specifically selected to match the thread form angle of the threads 24 of the carrier passage 21. One example of a selected angle could be thirty degrees. A portion 42 of the cutting surface 40, which is immediately adjacent to the tang portion 32, is curvilinear for a purpose to be explained hereinafter. This surface 42 is beneficial in that it does not weaken the key as adversely as would a right-angle corner.

The locking portion 31 in the preferred embodiment has a substantially triangular cross-section as can be seen in FIG. 4. This cross-section is essentially that of the original form of the wire before manufacture of the key. The apex area of the locking key portion is represented by the reference numeral 45 in the drawings.

The tang portion 32 is constructed so as to have a substantially rectangular cross-section except for one surface 46 opposite the flat, planar surface 34. This surface 46 is curvilinear for purposes to be explained hereinafter. In order to temporarily maintain the tang portion 32 within the key slot 25 as shown in FIG. 1, the tang portion is provided with a unique construction which permits frictional engagement of the tang portion with the walls of the key slot 25. Specifically, two pairs of opposing arcuate extensions 47a, 47b, 48a, 48b are cut or trimmed which extend from opposite sides of the tang portion, substantially at right angles with respect to the curvilinear surface 46. Each pair of extensions 47a, 47b and 48a, 48b respectively, is part of a circular design in that the arcuate extensions forms a partial area of a semicircle. The arcuate extensions 47a, 47b, 48a, 48b provide "high spots" along the respective edges of the tang portion 32 which hold the key 30 in a parallel orientation within the key slot 25 and with the least amount of friction required to do so. It should be appreciated that as the key 30 is pushed downwardly into the key slot during locking installation, the tangential contact area between the arcuate extensions and the respective wall of the key slots 25 serves as a ramp or guide for the key. Such tangential contact area deflects the wall of the key slot in such a manner that the slot essentially grips the key and holds it in the desired position firmly, (illustrated in FIG. 1), and as soon as vertical pressure is exerted on the key, the tangential contact allows the key to travel more easily within the slot.

To manufacture the preferred embodiment of the present invention the following process is employed. Wire which has a substantially triangular cross-section (illustrated by the locking portion 31 in FIGS. 2-4) is selected. A preferable material for this wire is a martensitic-type stainless steel. Using a conventional blank press, a blanking tool is specially designed to swage or form the tang portion of the key so as to create a substantially flat, rectangular cross-sectional portion. Simultaneously with the swaging action, the desired radius R and angle A for the cutting surface 40 are formed.

The wire is then drawn along within the same press where it is hit once again to form the curvilinear surface 46 on the tang portion. The radius of this surface 46 is important as it allows for the key slot depth to be less than might otherwise be required, therefore increasing the strength of the insert.

Using a conventional trim press, the arcuate extensions 47a, 47b, 48a, 48b are then cut from the swaged, now rectangular cross-section, tang portion. The width or distance across one pair of the arcuate extensions is gauged so as to be just slightly greater than the width of the key slot 25.

As a final step, the resulting key is heat treated using standard heat treat procedures as modified in order to achieve the desired Rockwell hardness and toughness. It may then be installed in a conventional manner in the key slot of an insert so as to be shipped to the customer in the finished form shown in FIG. 1.

Turning now to FIGS. 6-8, the key 30 is shown in a key slot 25 as it would appear when the customer receives the fastener assembly. FIGS. 7 and 8 illustrate two conventional shapes for a key slot, i.e. dove tail and T-shape. The present invention however, is intended for use in any conventional key slot.

To appreciate the advantages resulting from the present invention, FIGS. 9-14 are provided. In these drawings it is clearly shown that the threaded passage 21 of the carrier material 20 is not pre-broached, hence the descriptor for the present invention as being self-broaching. The key of the present invention must broach its own path through the threads of the passage in order to position itself in a locking relationship with the insert 22 and the carrier material 20.

As the installation tool (not shown) exerts a driving force (greater than the frictional force between the arcuate extensions and the key slot walls) upon the locking portion 31 of the key, the cutting surface 40 begins to penetrate and displace carrier material of the passage threads. In FIG. 9 it can be seen that the crest 51 of the first thread encountered by the key's cutting surface first collapses and then becomes a chip which rolls away from the cutting surface and moves into the root area of the thread adjacent thereto. This unique displacement of the thread chip leaves the cutting surface 40 clear as the key 30 continues its downward movement and the cutting surface 40 cuts through the crest 52 of the next thread. Such cutting action and displacement of thread chips continues until the top surface 33 of the key is seated flush with the carrier material as shown in FIG. 13. A study of FIGS. 10, 12 and 14 permit an appreciation for the fact that the cutting surface 40 cuts and displaces the chip material as described above. Further, the curvilinear portion 42 of the cutting surface 40 along with the curvilinear surface 46 of the tang portion assist the cutting surface 40 in the displacement of the carrier material by encouraging the chips to roll away from the cutting surface 40 and into the root of the carrier thread adjacent thereto. This is accomplished in the preferred embodiment by matching the radius of the cutting surface portion with that of the radius of the top or uppermost thread in the carrier passage 21.

From the foregoing it can be appreciated that the present invention provides a uniquely constructed key which is self-broaching and reliable in its installation process. The cutting action of such a key has, heretofore, been absent in the known prior art. Accordingly, the scope of protection afforded to this invention is believed limited solely by the claims which follow.

What is claimed is:

1. In combination, a self-broaching key and a fastener assembly installed in a threaded passage of a carrier material, said key locking the fastener assembly in the passage and comprising:
   an upper locking portion;
   a lower tang portion formed continuous with said upper locking portion; and
   a cutting surface extending between said upper locking portion and said lower tang portion, said cutting surface defined by a radius and a substantially flat angled surface, wherein the cutting surface is substantially identical to a thread form radius and angled surface of the uppermost thread in the carrier material.

2. The combination of claim 1 wherein said cutting surface further includes a curvilinear portion immediately adjacent said lower tang portion, said curvilinear portion being constructed to direct carrier material, displaced by said cutting surface, in a direction away from said cutting surface.

3. The combination of claim 1 further including means, on said lower tang portion, for frictionally positioning said lower tang portion within a key slot of the fastener assembly, said means being at least two arcuate surface areas extending at opposite sides of said lower tang portion, said arcuate surface areas being constructed so as to provide tangential contact between said key and the key slot.

4. In combination, a self-broaching key and a fastener assembly installed in a threaded passage of a carrier material, said key locking the fastener assembly in the passage and comprising:
   an upper locking portion;
   a lower tang portion formed continuous with said upper locking portion, said lower tang portion including means for frictionally retaining said key within a key slot of the fastener assembly, said means being at least two arcuate surface areas extending at opposite sides of said lower tang portion, said arcuate surface areas being constructed and arranged so as to provide tangential contact between said key and the key slot; and
   a cutting surface extending between said upper locking portion and said lower tang portion, said cutting surface defined by a radius and a substantially flat angled surface, wherein the cutting surface is substantially identical to a thread form radius and angled surface of the uppermost thread in the carrier material, and a curvilinear portion immediately adjacent said lower tang portion, said curvilinear portion being constructed to direct carrier material, displaced by said cutting surface, in a direction away from said cutting surface.

* * * * *